(12) United States Patent
Rihn et al.

(10) Patent No.: US 7,354,376 B2
(45) Date of Patent: Apr. 8, 2008

(54) MULTI SPEED TRANSMISSION

(75) Inventors: Matthieu Rihn, Lingolsheim (FR); Herve Schreiber, Obernai (FR)

(73) Assignee: GM Global Technology Operations, Inc., Detroit, MI (US)

( * ) Notice: Subject to any disclaimer, the term of this patent is extended or adjusted under 35 U.S.C. 154(b) by 175 days.

(21) Appl. No.: 11/296,172

(22) Filed: Dec. 7, 2005

(65) Prior Publication Data
US 2007/0129201 A1 Jun. 7, 2007

(51) Int. Cl.
*F16H 3/62* (2006.01)

(52) U.S. Cl. ............................. 475/284; 475/275

(58) Field of Classification Search ............... 475/275, 475/278, 284, 296, 325
See application file for complete search history.

(56) References Cited

U.S. PATENT DOCUMENTS

| | | | |
|---|---|---|---|
| 4,070,927 A | 1/1978 | Polak | 475/286 |
| 4,709,594 A | 12/1987 | Maeda | 475/280 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/219 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,375,592 B1 | 4/2002 | Takahashi et al. | 475/262 |
| 6,422,969 B1 | 7/2002 | Raghavan et al. | 475/276 |
| 6,425,841 B1 | 7/2002 | Haka | 475/275 |
| 6,471,615 B1 | 10/2002 | Naraki et al. | 475/262 |
| 6,558,287 B2 | 5/2003 | Hayabuchi et al. | 475/271 |
| 6,623,397 B1 | 9/2003 | Raghavan et al. | 360/96.5 |
| 6,840,885 B2 | 1/2005 | Yi et al. | 475/276 |
| 2007/0004551 A1* | 1/2007 | Andres | 475/275 |

FOREIGN PATENT DOCUMENTS

| | | |
|---|---|---|
| JP | 09-126283 | 5/1997 |
| WO | 03-095865 | 11/2003 |

* cited by examiner

*Primary Examiner*—Sherry Estremsky
*Assistant Examiner*—Edwin A Young

(57) ABSTRACT

A transmission is provided having a planetary gearset having respective first, second, and third members, and a compound gearset having respective first, second, third, and fourth members. The transmission also includes a plurality of selectively engageable torque transmitting devices configured to selectively interconnect selected members of the planetary gearset and the compound gearset for unitary rotation thereby to provide a plurality of forward speed ratios and at least one reverse speed ratio between an input member and an output member.

9 Claims, 2 Drawing Sheets

| | C1 | C2 | C3 | C4 | C5 | C6 | RATIO | STEP |
|---|---|---|---|---|---|---|---|---|
| 1 | X | X | | | | | 5.200 | |
| 2 | X | | X | | | | 2.933 | 1.773 |
| 3 | X | | | X | | | 2.000 | 1.466 |
| 4 | X | | | | X | | 1.517 | 1.318 |
| 5 | X | | | | | X | 1.238 | 1.226 |
| 6 | | | | | X | X | 1.000 | 1.238 |
| 7 | | | | X | | X | 0.829 | 1.206 |
| 8 | | | X | | | X | 0.708 | 1.171 |
| R | | X | | X | | | -4.860 | |

… (1)

MULTI SPEED TRANSMISSION

TECHNICAL FIELD

This invention relates to power transmissions having planetary gear arrangements.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point other than the most efficient point during cruising. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

A transmission is provided having an input member, an output member, and a stationary member. A planetary gearset includes respective first, second, and third members. A compound gearset includes respective first, second, third, and fourth members. The first member of the planetary gearset is continuously operatively connected to the input member for unitary rotation therewith. The second member of the planetary gearset is continuously grounded to the stationary member. The first member of the compound gearset is continuously operatively connected to the output member for unitary rotation therewith.

The transmission further includes first, second, third, fourth, fifth, and sixth torque transmitting devices that are operative to selectively connect members of the planetary gearset and the compound gearset with the stationary member or with other members of the planetary gearset or the compound gearset to provide at least eight forward speed ratios and one reverse speed ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
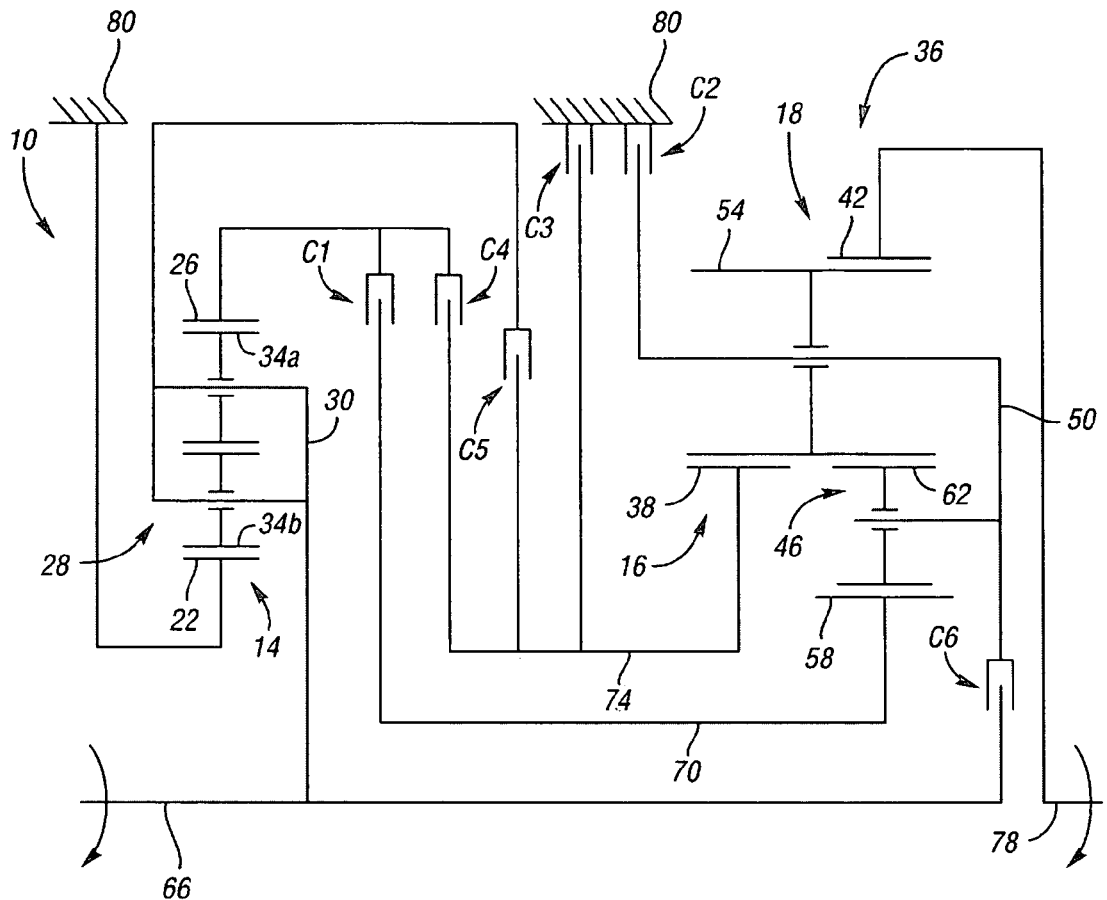
FIG. 1 is a schematic representation of a transmission in accordance with the present invention.
FIG. 2 is a ratio chart and truth table depicting a shift logic for use with the transmission of FIG. 1.

Referring to FIG. 1, a transmission 10 for a vehicle is schematically depicted. The transmission 10 includes planetary gearsets 14, 16, 18. Planetary gearset 14 includes a sun gear member 22, a ring gear member 26, and a planet carrier assembly 28. Planet carrier assembly 28 includes a planet carrier member 30, which rotatably supports a plurality of planetary pinion gear members. Planetary gearset 14 is compound, and therefore planet carrier member 30 rotatably supports a first set of planetary pinion gear members 34a that meshingly engage ring gear member 26, and a second set of planetary pinion gear members 34b that meshingly engage the first set of planetary pinion gear members 34a and sun gear member 22.

Planetary gearsets 16, 18 together form a compound gearset 36, and more particularly, compound gearset 36 is a Ravigneaux gearset. Planetary gearset 16 includes sun gear member 38 and ring gear member 42. Planet carrier assembly 46 includes planet carrier member 50, which rotatably supports planetary pinion gear members 54. Planetary gearset 16 further includes planet carrier member 50 and planetary pinion gear members 54, which meshingly engage ring gear member 42 and sun gear member 38.

Planetary gearset 18 includes sun gear member 58 and ring gear member 42. Planet carrier assembly 46 further includes planetary pinion gear members 62, which are rotatably mounted to planet carrier member 50. Planetary gearset 18 further includes planet carrier member 50 and planetary pinion gear members 54, 62. Planetary pinion gear members 62 meshingly engage sun gear member 58 and planetary pinion gear members 54.

It should be noted that, where used in the claims, first, second, third, and fourth members of a planetary gearset or a Ravigneaux gearset do not necessarily refer to a member of a particular type; thus, for example, a first member may be any one of a ring gear member, sun gear member, or planet carrier member.

The transmission includes an input member such as input shaft 66. Input shaft 66 is continuously connected to planet carrier member 30 for unitary rotation therewith. Input shaft 66 is connectable to an engine output member (not shown) such as a crankshaft, either directly or through a torque converter (not shown). Sleeve 70 is concentrically positioned around input shaft 66, and is continuously connected to sun gear member 58 for unitary rotation therewith. Sleeve 74 is concentrically positioned around sleeve 70, and is continuously connected to sun gear member 38 for unitary rotation therewith. An output member, such as output shaft 78, is continuously connected to ring gear member 42 for unitary rotation therewith. Output shaft 78 is connectable to a vehicle final drive system (not shown) to drive vehicle wheels (not shown) or other tractive device.

The transmission 10 includes a plurality of selectively engagable torque-transmitting devices, or clutches, C1-C6. Clutch C1 is selectively engageable to couple ring gear member 26 to sleeve 70 and sun gear member 58 for unitary rotation. Clutch C2 is a brake which is selectively engageable to ground planet carrier member 50 to a stationary member such as transmission housing 80. Clutch C3 is a brake which is selectively engageable to ground sleeve 74 and sun gear member 38 to housing 80. Clutch C4 is selectively engageable to couple ring gear member 26 to sleeve 74 and sun gear member 38 for unitary rotation. Clutch C5 is selectively engageable to couple planet carrier member 30 to sleeve 74 and sun gear member 38 for unitary rotation. Clutch C6 is selectively engageable to couple the input shaft 66 and planet carrier member 30 to planet carrier member 50 for unitary rotation.

An electronic control unit (not shown) is preferably employed to control the engagement of the torque transmitting devices C1-C6 via hydraulic actuation in a manner understood by those skilled in the art.

Referring to FIG. 2, a shift logic sequence for clutches C1-C6 is depicted that provides eight forward speed ratios and one reverse speed ratio between the input member 66 and the output member 78. Referring to FIGS. 1 and 2, a first forward speed ratio is achieved when clutches C1 and C2 are engaged. A second forward speed ratio is achieved when clutches C1 and C3 are engaged. A third forward speed ratio is achieved when clutches C1 and C4 are engaged. A fourth forward speed ratio is achieved when clutches C1 and C5 are engaged. A fifth forward speed ratio is achieved when clutches C1 and C6 are engaged. A sixth forward speed ratio is achieved when clutches C5 and C6 are engaged. A seventh forward speed ratio is achieved when clutches C4 and C6 are engaged. An eighth forward speed ratio is achieved when clutches C3 and C6 are engaged. A reverse speed ratio is achieved when clutches C2 and C4 are engaged.

It should be noted, as apparent from FIG. 2, that transmission 10 is characterized by single step speed ratio interchanges between adjacent forward speed ratios being accomplished by single transition shifting. It should be further noted that clutch C2 may be used for friction launch to eliminate a torque converter between an engine output member and the input shaft 66. Planetary gearset 14 generates an underdrive ratio.

Figure 3:
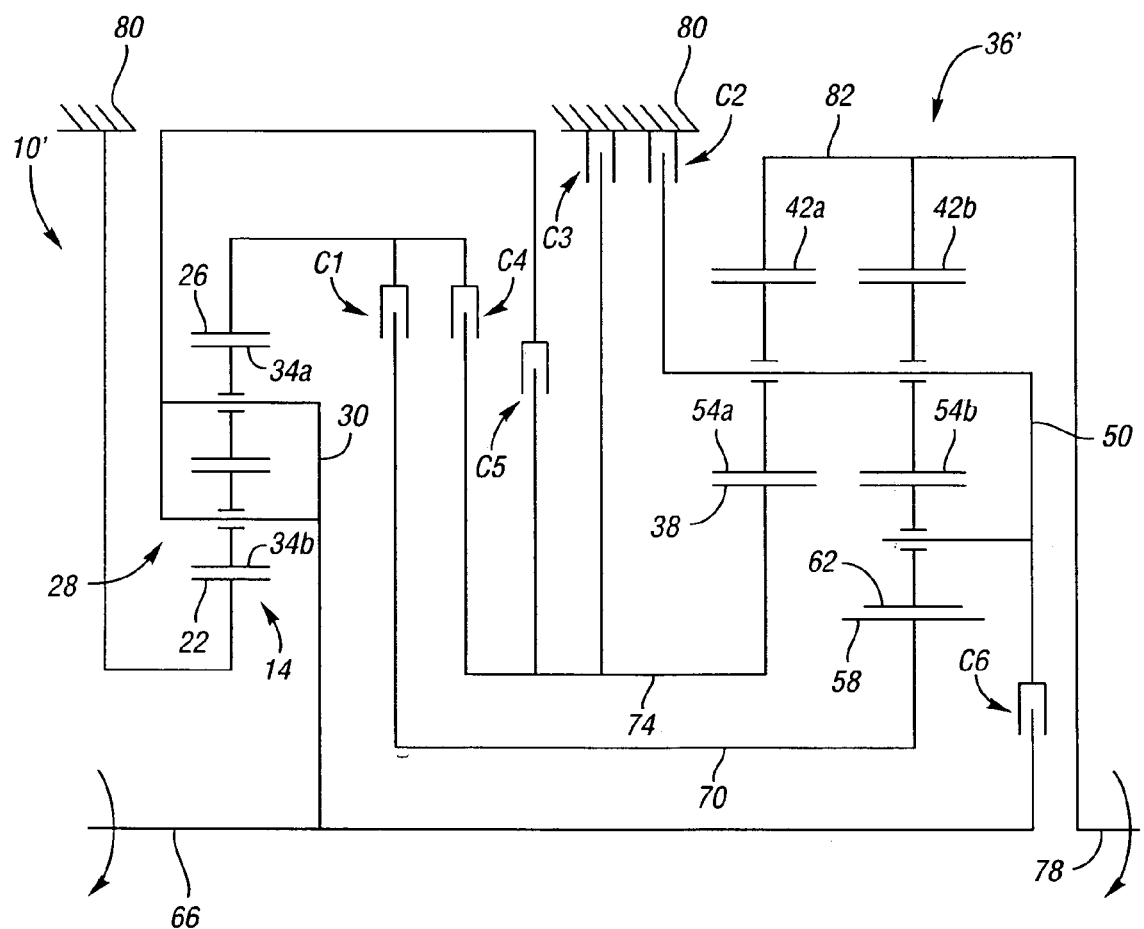
FIG. 3 is a schematic representation of a second embodiment of a transmission in accordance with the present invention.

Referring to FIG. 3, wherein like reference numbers refer to like components from FIG. 1, an alternative transmission 10' is schematically depicted. Transmission 10' is similar to the transmission shown at 10 in FIG. 1 except for the arrangement of the compound gearset. Compound gearset 36' of transmission 10' includes sun gear members 38, 58 and planet carrier member 50. Compound gearset 36' further includes a member, such as drum 82, which rigidly interconnects ring gear members 42a and 42b. Planet carrier member 50 rotatably supports planetary pinion gear member 54a, 54b, and 62. Planetary pinion gear member 54a is meshingly engaged with ring gear member 42a and with sun gear member 38. Planetary pinion gear member 54b is meshingly engaged with ring gear member 42b. Planetary pinion gear member 58 is meshingly engaged with sun gear member 58 and planetary pinion gear member 42b. Output shaft 78 is continuously connected to drum 82 for unitary rotation therewith.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
    an input member; an output member; a stationary member;
    a planetary gearset having respective first, second, and third members;
    a compound gearset having respective first, second, third, and fourth members;
    said first member of said planetary gearset being continuously operatively connected to said input member for unitary rotation therewith;
    said second member of said planetary gearset being continuously grounded to said stationary member;
    said first member of said compound gearset being continuously operatively connected to said output member for unitary rotation therewith;
    first, second, third, fourth, fifth, and sixth torque transmitting devices being operative to selectively connect members of said planetary gearset and said compound gearset with said stationary member or with other members of said planetary gearset or said compound gearset to provide at least eight forward speed ratios;
    wherein said first torque transmitting device is configured to selectively couple said third member of said planetary gearset with said second member of said compound gearset for unitary rotation;
    wherein said second torque transmitting device is configured to selectively couple said third member of said compound gearset with said stationary member;
    wherein said third torque transmitting device is configured to selectively couple said fourth member of said compound gearset with said stationary member;
    wherein said fourth torque transmitting device is configured to selectively couple said third member of said planetary gearset and said fourth member of said compound gearset for unitary rotation;
    wherein said fifth torque transmitting device is configured to selectively couple said first member of said planetary gearset and said fourth member of said compound gearset for unitary rotation; and
    wherein said sixth torque transmitting device is configured to selectively couple said input member and said first member of said planetary gearset with said third member of said compound gearset for unitary rotation.

2. The transmission of claim 1, wherein said compound gearset includes a first sun gear member, a second sun gear member, a first ring gear member, a first planet carrier member, a first planetary pinion member rotatably connected with respect to the first planet carrier member and meshingly engaged with said first sun gear member and said first ring gear member, and a second planetary pinion member rotatably connected with respect to the first planet carrier member and meshingly engaged with said second sun gear member and said first planetary pinion member.

3. The transmission of claim 2, wherein said first member of said compound gearset is said first ring gear member; wherein said second member of said compound gearset is said second sun gear member; wherein said third member of said compound gearset is said first planet carrier member; and wherein said fourth member of said compound gearset is said first sun gear member.

4. The transmission of claim 3, wherein said planetary gearset includes a third sun gear member, a second ring gear member, and a second planet carrier member; and wherein said first member of said planetary gearset is said second planet carrier member, said second member of said planetary gearset is said third sun gear member, and said third member of said planetary gearset is said second ring gear member.

5. The transmission of claim 1, wherein said compound gearset includes a first sun gear member, a second sun gear member, a first ring gear member, a second ring gear member; an interconnecting member interconnecting the first and second ring gear members for unitary rotation; a planet carrier member, a first planetary pinion member rotatably connected with respect to the planet carrier member and meshingly engaged with said first sun gear member and said first ring gear member, a second planetary pinion member rotatably connected with respect to the planet carrier member and meshingly engaged with said second sun gear member, and a third planetary pinion member rotatably connected with respect to the planet carrier member and meshingly engaged with said second planetary pinion member and said second ring gear member.

6. The transmission of claim 5, wherein said first member of said compound gearset is said interconnecting member; wherein said second member of said compound gearset is said second sun gear member; wherein said third member of said compound gearset is said planet carrier member; and wherein said fourth member of said compound gearset is said first sun gear member.

7. The transmission of claim 1, wherein single step speed ratio interchanges between adjacent forward speed ratios are accomplished as single transition interchanges.

8. A transmission comprising:
an input member; an output member; a stationary member;
a planetary gearset including a first sun gear member, a first ring gear member, and a first planet carrier member;
a compound gearset including a second sun gear member, a third sun gear member, a second ring gear member, a second planet carrier member, a first planetary pinion member rotatably supported by the second planet carrier member and meshingly engaged with the second sun gear member and with the second ring gear member, a second planetary pinion member rotatably supported by the second planet carrier member and meshingly engaged with the third sun gear member and the first planetary pinion member;
said first sun gear member being continuously grounded to said stationary member; said first planet carrier member being continuously operatively connected to said input member; said second ring gear member being continuously operatively connected to said output member; and first, second, third, fourth, fifth, and sixth torque transmitting devices being operative to selectively connect members of said planetary gearset and said compound gearset with said stationary member or with other members of said planetary gearset or said compound gearset to provide at least eight forward speed ratios;
wherein said first torque transmitting device is configured to selectively couple said first ring gear member and said third sun gear member for unitary rotation; wherein said second torque transmifting device is configured to selectively couple said second planet carrier member and said stationary member wherein said third torque transmitting device is configured to selectively couple said second sun gear member and said stationary member; wherein said fourth torque transmitting device is configured to selectively couple said first ring gear member and said second sun gear member for unitary rotation; wherein said fifth torque transmitting device is configured to selectively couple said first planet carrier member and said second sun gear member for unitary rotatiom and wherein said sixth torque transmitting device is configured to selectively couple said first planet carrier member and said input member with said second planet carrier member for unitary rotation.

9. A transmission comprising:
an input member; an output member; a stationary member;
a planetary gearset including a first sun gear member, a first ring gear member, and a first planet carrier member;
a compound gearset including a second sun gear member, a third sun gear member, a second ring gear member, a second planet carrier member, a first planetary pinion member rotatably supported by the second planet carrier member and meshingly engaged with the second sun gear member and with the second ring gear member, a second planetary pinion member rotatably supported by the second planet carrier member and meshingly engaged with the third sun gear member and the first planetary pinion member;
said first sun gear member being continuously grounded to said stationary member; said first planet carrier member being continuously operatively connected to said input member; said second ring gear member being continuously operatively connected to said output member;
a first torque transmitting device being configured to selectively couple said first ring gear member and said third sun gear member for unitary rotation; a second torque transmitting device being configured to selectively couple said second planet carrier member and said stationary member; a third torque transmitting device being configured to selectively couple said second sun gear member and said stationary member; a fourth torque transmitting device being configured to selectively couple said first ring gear member and said second sun gear member for unitary rotation; a fifth torque transmitting device being configured to selectively couple said first planet carrier member and said second sun gear member for unitary rotation; and a sixth torque transmitting device being configured to selectively couple said first planet carrier member and said input member with said second planet carrier member for unitary rotation.

* * * * *